United States Patent
Reeve et al.

(10) Patent No.: US 11,537,445 B2
(45) Date of Patent: Dec. 27, 2022

(54) DYNAMIC INTEGRATION FLOWS IN HYBRID CLOUD ENVIRONMENTS

(71) Applicant: International Business Machines Corporation, Armonk, NY (US)

(72) Inventors: John Anthony Reeve, Winchester (GB); Trevor Clifford Dolby, Southampton (GB); Andrew John Coleman, Petersfield (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 16/572,727

(22) Filed: Sep. 17, 2019

(65) Prior Publication Data
US 2021/0081254 A1 Mar. 18, 2021

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC ........................... G06F 9/5083; G06F 9/4881
See application file for complete search history.

(56) References Cited

U.S. PATENT DOCUMENTS

| | | | |
|---|---|---|---|
| 7,430,692 B2 | 9/2008 | White, III | |
| 9,398,087 B1 | 7/2016 | Hosie | |
| 10,348,516 B2 * | 7/2019 | Coleman | H04L 65/1069 |
| 2006/0015608 A1 | 1/2006 | Becker | |
| 2007/0214429 A1 | 9/2007 | Lyudovyk | |
| 2012/0110600 A1 | 5/2012 | Carey | |
| 2014/0192808 A1 * | 7/2014 | Thubert | H04L 45/64 370/392 |
| 2014/0317172 A1 | 10/2014 | Granshaw | |
| 2015/0256477 A1 * | 9/2015 | Bragstad | H04L 65/60 709/226 |
| 2016/0034318 A1 | 2/2016 | Byreddy | |
| 2016/0283200 A1 * | 9/2016 | Standley | G06F 9/5072 |
| 2017/0257429 A1 | 9/2017 | Hosie | |
| 2017/0286187 A1 * | 10/2017 | Chen | G06F 9/48 |
| 2018/0083924 A1 | 3/2018 | Hosie | |
| 2020/0394455 A1 * | 12/2020 | Lee | G06K 9/6259 |

OTHER PUBLICATIONS

Hosseini Shirvani, Mirsaeid ; Rahmani, Amir Masoud ; Sahafi, Amir; An iterative mathematical decision model for cloud migration: A costand security risk approach;2018 vol. 48(3); pp. 449-485.*

"Callable Message Flows", IBM Knowledge Center, Last updated Sep. 19, 2018 13:03:01, 6 pages, <https://www.ibm.com/support/knowledgecenter/en/SSMKHH_10.0.0/com.ibm.iib.cloud.doc/cl00029_.htm >.

* cited by examiner

*Primary Examiner* — Camquy Truong
(74) *Attorney, Agent, or Firm* — Aaron N. Pontikos

(57) ABSTRACT

A computer-implemented method for deploying an application between an on-premise server and an off-premise server includes identifying a plurality of nodes in a flow of an application deployed on the on-premise server. The computer-implemented method further includes splitting the flow at the plurality of nodes to form a plurality of sub-flows of the application. The computer-implemented method further includes routing a flow execution workload of the application to the plurality of sub-flows of the application.

19 Claims, 9 Drawing Sheets

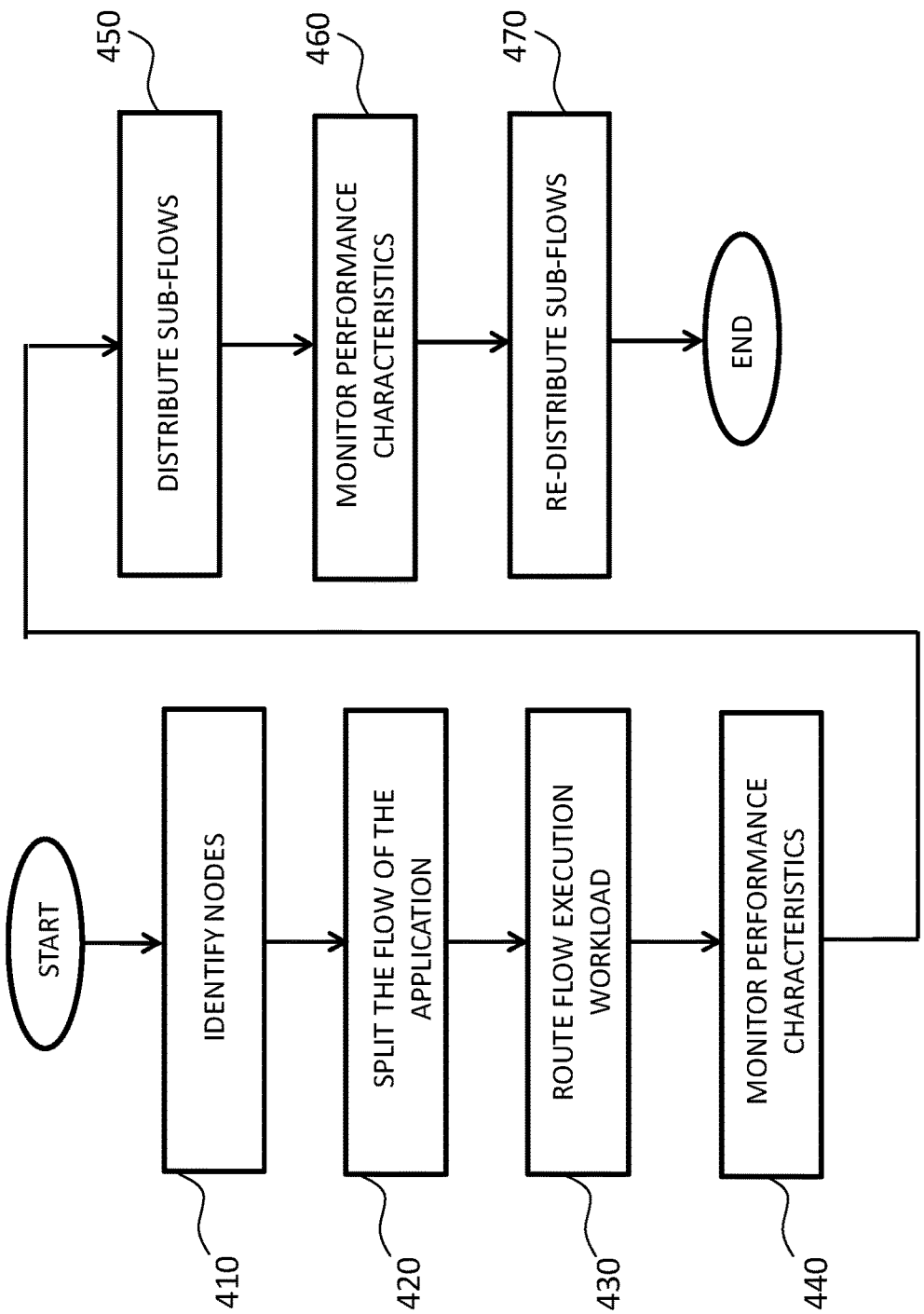

DYNAMIC INTEGRATION FLOWS IN HYBRID CLOUD ENVIRONMENTS

BACKGROUND

The present invention relates generally to application deployment, and more particularly to application deployment in hybrid cloud environments.

Communication between on-premise and off-premise platforms is required in Software as a Service (SaaS) environments and hybrid integration systems. SaaS is a software licensing and delivery model in which software is licensed on a subscription basis and is centrally hosted by an off-premise platform (such as a shared computing resource or a cloud computing resource accessible, for example, via the Internet). SaaS is typically accessed by users of an on-premise platform (for example, using a thin client via a web browser). Hybrid integration systems deploy parts of the integration in an off-premise platform and other parts in an on-premise platform.

On-premise platforms are well-established and considered to provide a good level of security because data is stored and handled internally, e.g., within an internal private network. Off-premise platforms (such as cloud computing resources) are a relatively recent and evolving concept. Generally, reference to off-premise resources or platforms is taken to refer to a concept for enabling ubiquitous, convenient, and on-demand access via Internet to shared pools of configurable off-premise (e.g. remotely located) computing resources such as networks, applications, servers, storages, applications, functionalities, and the like which are accessible via the Internet. Conversely, reference to on-premise resources or platforms is taken to refer to a concept of local or private computing resources such as networks, servers, storage devices, application, etc. that are situated locally or within/behind a virtual boundary (often behind a firewall).

Integration of applications and services typically involves: (i) configuring a flow (otherwise referred to as an 'application flow' or 'integration flow'), which describes the flow of data between applications and the processing performed on data inputs and outputs; and (ii) parsing and transforming the data to a format that is consumable by another application or service. Such flows are typically stored in a format such as eXtensible Markup Language (XML), JavaScript Object Notation (JSON), or YAML Ain't Markup Language (YAML), and can be interpreted by a particular runtime as a set of instructions (where each discrete set of instructions is called a node) for interacting with other systems. The flows are configured by connecting together a sequence of nodes, each of which is tailored to perform a particular task (e.g. transform, filter, and aggregate). An integration product of an on-premise or off-premise platform then processes the data as specified by the flow.

SUMMARY

The present invention provides for deploying an application in a hybrid cloud environment. More particularly, the present invention enables the flow of the application to be split and deployed across multiple flow engines located within on-premise and/or off-premise platforms, thus providing, for example, improved flexibility, performance, and scalability.

According to one embodiment of the present invention, a computer-implemented method for deploying an application between an on-premise server and an off-premise server is disclosed. The computer-implemented method includes identifying a plurality of nodes in a flow of an application deployed on the on-premise server. The computer-implemented method further includes splitting the flow at the plurality of nodes to form a plurality of sub-flows of the application. The computer-implemented method further includes routing a flow execution workload of the application to the plurality of sub-flows of the application.

According to another embodiment of the present invention, a computer program for deploying an application between an on-premise server and an off-premise server is disclosed. The computer program product includes one or more computer readable storage media and program instructions stored on the one or more computer readable storage media. The program instructions include instructions to identify a plurality of nodes in a flow of an application deployed on the on-premise server. The program instructions further include instructions to split the flow at the plurality of nodes to form a plurality of sub-flows of the application. The program instructions further include instructions to rout a flow execution workload of the application to the plurality of sub-flows of the application.

According to another embodiment of the present invention, a computer system for deploying an application between an on-premise server and an off-premise server is disclosed. The computer system includes one or more computer system includes one or more computer processors, one or more computer readable storage media, and program instructions stored on the computer readable storage media for execution by at least one of the one or more processors. The program instructions include instructions to identify a plurality of nodes in a flow of an application deployed on the on-premise server. The program instructions further include instructions to split the flow at the plurality of nodes to form a plurality of sub-flows of the application. The program instructions further include instructions to rout a flow execution workload of the application to the plurality of sub-flows of the application.

BRIEF DESCRIPTION OF THE DRAWINGS

Various embodiments of the present invention will now be described, by way of example only, with reference to the following drawings, in which:

FIG. 4 depicts a flow diagram of a method for deploying an application across off-premise and/or on-premise servers in accordance with at least one embodiment of the present invention;

DETAILED DESCRIPTION

Figure 1:
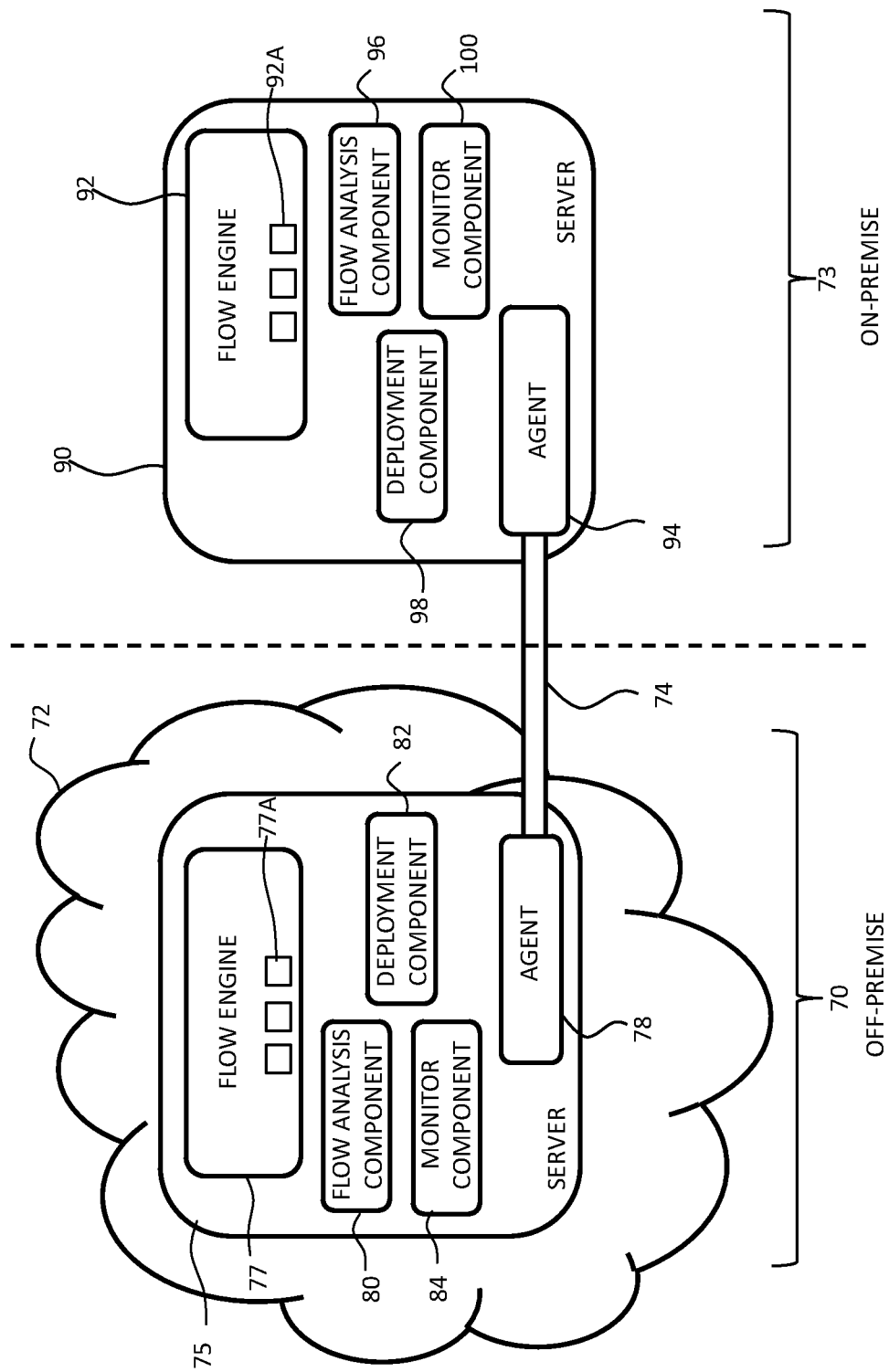
FIG. 1 is a simplified block diagram of a hybrid cloud system in accordance with at least one embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer (i.e. a computer-implementable method). The various steps of the method therefore reflect various parts of a computer program, e.g. various parts of one or more algorithms.

Furthermore, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet, and so on to cooperatively execute at least one embodiment of the methods of the present invention.

An "application" may be understood as being a processing resource, routine, set of instructions, data system, or processing construct which may be provided in a structured or ordered manner. Thus, when employed for integration between off-premise and/or on-premise resources (such as may be done in cloud-based provision of software to a user of an on-premise resource, or as part of a SaaS environment), one or more of the instructions, routines or processes of an application may be accessed by an external system, thus requiring communication between the off-premise and/or on-premise resources.

A flow (i.e., "application flow" or "integration flow") describes the flow of data between applications or systems, and the processing performed on data inputs and outputs to those applications/systems. A flow document is typically stored in a predefined format and can be interpreted by a particular runtime as a set of instructions (where each discrete set of instructions is called a node) for interacting with other applications/systems.

A sub-flow is thus a subsection of a flow which contains one or more nodes, that when combined with other sub-flows, creates the full flow. A sub-flow can therefore be considered to be like a function in a library which an application then strings those functions together to make the full program. The same is true for a flow—it strings together sub-flows to make up the whole flow. Further, a callable sub-flow is logically the same as a normal subflow, but it can be run in remote servers. In this way, when a main flow calls a subflow, a callable flow mechanism calls the remote flow causing it to execute. In all other ways it is the same as a subflow running in the same process as the main flow.

In some embodiments of the present invention, an application is initially deployed on an off-premise server, wherein the flow of the application is split at identified nodes in the flow of the application so as to form a plurality of sub-flows of the application. In other embodiments of the present invention, an application is initially deployed on an on-premise server, wherein the flow of the application is split at identified nodes in the flow of the application so as to form a plurality of sub-flows of the application.

In various embodiments of the present invention, an application's flow is automatically decomposed into component nodes (i.e. discrete sets of processing steps, each of which can become a callable sub-flow), wherein the callable sub-flows are further automatically redistributed. Such automatic redistribution of these callable sub-flows may be based on observable criteria, including, but not limited to CPU requirements, so as to achieve an optimised form of the original application flow that is spread across multiple servers both off-premise (e.g., in the cloud) and on-premise.

Accordingly, in some embodiments, a running flow is monitored, whereby individual callable sub-flows can be redistributed to other servers based on the monitoring results. Although portions of callable sub-flows may exist on different servers located in a mixture of different environments (e.g., on-premise and off-premise), the distributed application flow remains functionally identical to the original application flow, but operates in a more efficient and scalable manner.

In some embodiments, after the flow is split into individual callable sub-flows, various optimizations may be possible, such as recombining certain nodes if they are closely related or have data-sharing characteristics that make remote execution less profitable. For this reason, some embodiments can be configured to analyze individual callable subflows across multiple distinct integration flows to find common aspects that can be shared for greater scalability. For instance, CPU usage or memory capacity measurements may be used to decide which servers should run which parts of a flow.

Various embodiments of the present invention recognize that integration flows contain within it the idea of wiring nodes, and thus have natural 'breaks' between nodes which allow for insertion of probes and points of decomposition. The imperative style of a flow language would normally make automatic optimization quite difficult (unlike purely functional or declarative languages), but embodiments of the present invention recognize that the 'breaks' may provide an opportunity to optimize without modifying the behaviour of the flow.

By way of example, the flow engine of a server may execute some of the nodes within a flow and then call across to other servers to have them execute other nodes within the same flow. In this way, a developer does not have to construct interface specifications to enable this pattern of execution. Rather, due to the nature of callable sub-flows created by various embodiments of the present invention, both data and exceptions may be propagated between servers without a developer or administrator having to be involved (or even aware).

Embodiments of the present invention recognize that the use of integration flows in a scalable manner across off-premise (e.g., cloud) servers and on-premise servers may be achieved with current technology and products. However, conventional approaches require advance preparation by both flow developers and administrators. Conversely, various embodiments of the present invention may avoid such a need for advance preparation, while still preserving scalability and hybrid-cloud advantages.

In particular, various embodiments of the present invention may provide the advantage of enabling automatic optimization. Furthermore, various embodiments of the present invention may provide the benefit that a developer/administrator need not be involved in (or aware of) the redistribution of component parts of the flow. This is unlike conventional flow distribution approaches which require developer intent and/or administrator knowledge.

Embodiments of the present invention provide for identifying nodes in the flow of an application and then splitting the flow of the application at identified nodes so as to form a plurality of sub-flows of the application. The plurality of sub-flows may then be distributed across various servers in an optimal manner (e.g. so that each sub-flow is executed by the most appropriate server). This can provide for improved execution efficiency while maintaining flow procedures and functionality.

In various embodiments of the present invention, a system is provided which supports a callable flow mechanism. For instance, while an application flow is running on a server, it may be dynamically split into a plurality of separately callable sub-flows. The individual sub-flows may be pushed to servers in the network which are part of the callable flow system. In some embodiments, an application is initially deployed on a first on-premise server, wherein an application flow is split at a node to form a plurality of sub-flows, and one or more sub-flows in the plurality of sub-flows are redistributed to a second on-premise server. In some embodiments, an application is initially deployed on a first off-premise server, wherein an application flow is split at a node to form a plurality of sub-flows, and one or more sub-flows in the plurality of sub-flows are redistributed to a second off-premise server. In some embodiments, an application is initially deployed on an on-premise server, wherein an application flow is split at a node to form a plurality sub-flows, and one or more sub-flows in the plurality of sub-flows are redistributed to an off-premise server. In some embodiments, an application is initially deployed on an off-premise server, wherein an application flow is split at a node to form a plurality of sub-flows, and one or more sub-flows in the plurality of sub-flows are redistributed to an on-premise server. One of ordinary skill in the art will appreciate that because the servers that make up the callable flow system can be on-premise, off-premise (i.e., on-cloud), or a mixture of both, a workload of the application may be distributed throughout the various on-premise and/or off-premise resources.

Various embodiments of the present invention can employ a monitor component configured to monitor a performance characteristic of the sub-flows of the application. In various embodiments of the present invention, a deployment component can be configured to distribute the sub-flows across the on-premise and/or off-premise servers based on the performance characteristic(s) of the sub-flows of the application. In an embodiment, a sub-flow is distributed from an on-premise server to an off-premise server, or vice versa, based, at least in part, on a performance characteristic being below a predetermined threshold. For example, one or more of the servers that make up the callable flow system may monitor performance of individual sub-flows and redistribute them to other servers based on the analysis in order to improve running of the sub-flow. In some embodiments, such analysis may result in the duplication of individual callable flows and/or sub-flows where the analysis shows throughput will be increased.

By way of example, in some embodiments, a decomposition component can be configured to form a plurality of instances of the same sub-flow of the application. The flow execution component can then be configured to route flow execution workload of the application to a plurality of instances of the same sub-flow of the application. For example, a server may re-use sub-flows from one or more flows in other, nominally different flows when it detects that the functions in each are identical and/or functionally equivalent. This may allow better usage of resources when multiple integration flows are deployed.

Further, in some embodiments, the decomposition component can be configured to combine at least two of the plurality of sub-flows of the application to form a modified sub-flow of the application based on the performance characteristic(s) of the sub-flows of the application. For example, a server of the callable flow system may recombine individual sub-flow nodes into groups of nodes based on desired performance characteristics. This may include trade-offs such as, but not limited to, "more network and less compute," or vice-versa.

In some embodiments, the deployment component can be configured to distribute the sub-flows across the on-premise and/or off-premise servers based on a target performance characteristic. In an embodiment, a sub-flow is distributed from an on-premise server to an off-premise server, or vice versa, based, at least in part, on a performance characteristic being above a predetermined threshold after distribution of the sub-flow. A target performance characteristic can include, but is not limited to, one or more of: latency, throughput, round-trip time, CPU utilization, available bandwidth, and a storage requirement(s).

In some embodiments, weighted analysis can be employed to decide which server to push callable nodes to. For example, if an analysis shows that the overall processing time increases for some segments, nodes may be recombined to shorten the execution time.

In an embodiment, a secure tunnel can be established for communicating a flow execution workload between an off-premise server and an on-premise server, between multiple off-premise servers, and/or between multiple on-premise servers. Communication between servers may therefore be implemented over a secure connection. For example, a mutually authenticated TLS tunnel connection may be utilized to transfer data between an off-premise environment and an on-premise environment. Secure communications between off-premise and/or on-premise platforms may therefore be provided.

In various embodiments of the invention, a system can manage deployment of an application flow across off-premise and/or on-premise systems by splitting the flow of the application into sub-flows at nodes that are identified in the flow of the application. In some embodiments, the system can be adapted to establish a secure tunnel for routing a flow execution workload to the sub-flows.

In some embodiments, an off-premise server can be a cloud server. In these embodiments, the off-premise server can be employed, for example, in a hybrid system or SaaS environment for the provision of cloud-based services over the internet.

Accordingly, various embodiments of the present invention can provide for the automatic cloud hybridization of integration flows. This may enable the use of integration flows in a scalable manner across cloud and on-premise servers. Furthermore, various embodiments of the present invention can be employed in a server device. Such server device may be a cloud-based server resource accessible via the Internet.

Illustrative embodiments of the present invention provide for dynamically splitting one or more nodes in an application flow into separately callable sub-flows and then deploying one or more of these separately callable sub-flows on servers throughout similar or distinct network environments. Various illustrative embodiments can also provide for monitoring performance of individual sub-flows and redistributing, duplicating or grouping sub-flows based on the monitored performance of the sub-flows (e.g. to improve one or more performance characteristics such as latency, throughput, round-trip time, CPU usage, available network bandwidth and storage requirements).

Various embodiments of the present invention can also re-combine sub-flows into groups to meet desired or required performance characteristics. Furthermore, various embodiments of the present invention can be configured to re-use sub-flows in other nominally different application flows when it is detected that the functions in each flow are identical and/or functionally equivalent. This may provide for improved usage of resources when many application flows are deployed.

Modifications and additional steps to a traditional SaaS implementation can also be provided which may enhance the value and utility of the various embodiments of the present invention. Illustrative embodiments of the present invention can be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention. Moreover, the system may take the form of any of a number of different processing devices including client computing devices, server computing devices, a tablet computer, laptop computer, telephone or other communication devices, personal digital assistants (PDAs), or the like. In some illustrative examples, an off-premise device and/or an on-premise device may comprise a portable computing device that is configured with flash memory to provide non-volatile memory for storing operating system files and/or user-generated data, for example. Thus, the system may essentially be any known or later-developed processing system without architectural limitation.

In an embodiment, a hybrid cloud system is enhanced by providing a component or method that dynamically splits an application flow into sub-flows and then distributes the sub-flows across (on-premise and/or off-premise) servers of a network.

In various embodiments of the present invention, application flows are distributed across on-premise and/or off-premise servers in a scalable manner while maintaining process behaviour of the application flow. Such embodiments can extend or improve the scalability, flexibility and/or efficiency of a hybrid cloud system.

The present invention may be a system, a method, and/or a computer program product at any possible technical detail level of integration. The computer program product may include a computer readable storage medium (or media) having computer readable program instructions thereon for causing a processor to carry out various aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To aid in understanding the various concepts of the present invention, a hybrid cloud system in accordance with at least one embodiment of the present invention will now be described with reference to FIG. 1. Hybrid cloud system includes off-premise environment 70 in the cloud 72 communicatively coupled to on-premise environment 73 via an Internet communication link 74.

Off-premise environment 70 includes an off-premise server 75. The off-premise server 75 is a cloud-based server (e.g., a public cloud server) and includes a flow engine 77 (running one or more sub-flows 77A), an agent 78, a flow analysis component 80, a deployment component 82, and a monitor component 84.

On-premise environment 73 may be an on-premise system and/or private cloud. The on-premise environment 73 includes an on-premise server 90 (e.g., local server) that is run and maintained by a user directly. One of ordinary skill in the art will appreciate that the on-premise server 90 can also be run in its own private cloud. The on-premise server 90 includes a flow engine 92 (running one or more sub-flows 92A), an agent 94, a flow analysis component 96, a deployment component 98, and a monitor component 100.

The agents 78, 94 running on off-premise server 75 and on-premise server 90, respectively, can be used to construct a secure communication tunnel between the off-premise server 75 and the on-premise server 90 to allow for the exchange of sub-flows deployed and the calling of sub-flows running on different servers.

The flow analysis components 80, 96 located on off-premise server 75 and on-premise server 90, respectively, can be configured to identify a plurality of nodes in the flow of an application. A decomposition component for each of off-premise server 75 and on-premise server 90 can be configured to split the flow of the application at the identified plurality of nodes to form a plurality of sub-flows of the application. Here, the splitting of a flow into separate callable sub-flows is undertaken by the flow engines 77, 92 (located on off-premise server 75 and on-premise server 90, respectively) and is transparent to a user and does not change the interface between each node of the application flow. In other words, a user does not have to re-engineer flows to make use of the embodiments of the present invention. The flow engines 77, 92 may therefore each be thought of as implementing a decomposition component to split a flow of an application at identified nodes so as to form a plurality of sub-flows of the application.

In various embodiments of the present invention, the flow engines 77, 92 can be configured for running an application flow. Each flow engine can call other flow engines using a callable flow mechanism.

In an embodiment, flow engines 77, 92 run any flow as a set of sub-flows (e.g., sub-flows 77A, 92A) where there is a separate callable sub-flow created for each node in an application flow.

In an embodiment, deployment components 82, 98 are configured to distribute the generated sub-flows across the off-premise server 75 and/or on-premise server 90 based on performance characteristic(s) of the sub-flows of the application. For this purpose, the monitor components 84, 100 are configured to monitor performance characteristics of the sub-flows 77A, 92A. For example, the monitor components 84, 100 may record statistics about how sub-flows 77A, 92A are executing (e.g. an amount of CPU resource used or elapsed time for each node). Other performance characteristics that may be monitored and used to distribute the generated sub-flows may include, but are not limited, to: throughput, round-trip time, CPU utilization, available bandwidth, and storage requirement(s).

By way of example, the deployment components 82, 98 may be configured to check the performance characteristic(s) for each sub-flow. Based on such performance metrics, the deployment components 82, 98 may identify sub-flows that can be moved to another server (on-premise and/or off-premise) in order to improve performance or scalability. For example, the deployment component 98 may move CPU-intensive sub-flows from on-premise server 90 to off-premise server 75 located in cloud 72 as needed.

One of ordinary skill in the art will appreciate that in some embodiments, the on-premise server 90 and off-premise server 75 are effectively mirror images of each other. An initial deployment of a flow can therefore be from off-premise environment 70 and/or on-premise environment 73.

By way of example, and with reference to FIG. 2, an example of an initial deployment of an application flow 105 on on-premise server 90 of FIG. 1 will now be described. In this example, the application flow 105 is a standard ACE v11 flow that needs no modification. More specifically, FIG. 2 depicts an example of the splitting of an application flow into sub-flows and moving or distributing sub-flows among available servers.

Figure 2:
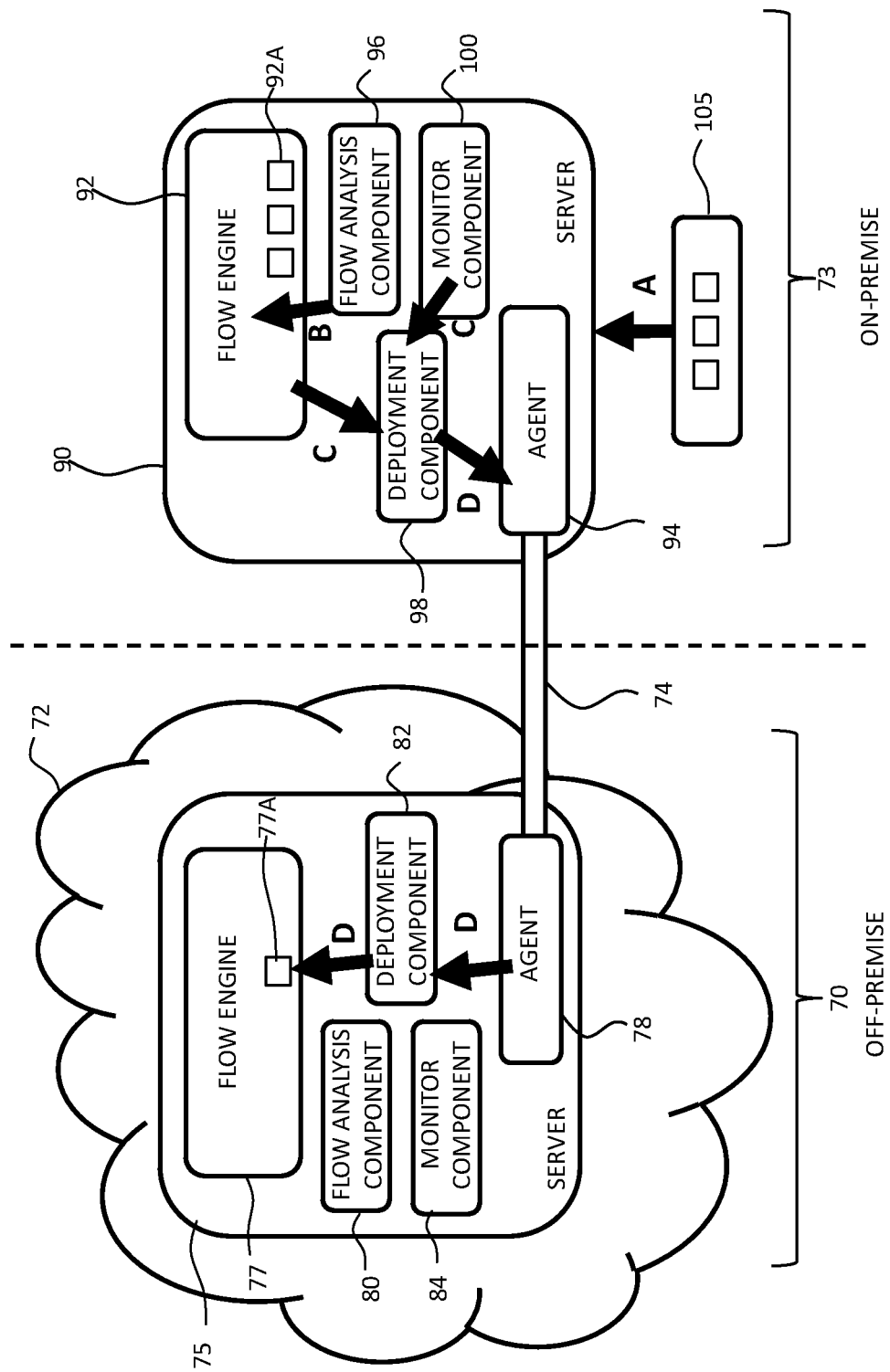
FIG. 2 illustrates an example of an initial deployment of an application flow from the on-premise server of FIG. 1 in accordance with at least one embodiment of the present invention.

As indicated by the arrow labeled "A" in FIG. 2, an application flow 105 is sent to the on-premise server 90. The application flow 105 is provided to the flow engine 92 of the on-premise server 90 via the flow analysis component 96 (indicated by the arrow labeled "B" in FIG. 2). The flow analysis component 96 identifies a plurality of nodes in the application flow 105. The flow engine 92 splits the application flow 105 at the identified plurality of nodes to form a plurality of sub-flows 92A and then runs/executes the sub-flows 92A. The collection of sub-flows 92A are functionally equivalent to the full application flow 105.

The monitor component 100 monitors performance characteristics of the executed sub-flows 92A. For example, if the monitor component 100 identifies a particular sub-flow that has a high CPU usage, and the on-site server 90 is constrained on CPU resources, the monitor component 100 will instruct the deployment component 98 to distribute the particular sub-flow to a different server (e.g., off-site server 75). In such a case, deployment component 98 then retrieves the identified sub-flow from the flow engine 92 so as to redistribute the identified sub-flow 92A (indicated by the arrows labeled "C" in FIG. 2). Here, the deployment component 98 deploys the identified sub-flow (one of sub-flows 92A) via the agent 94 of the on-premise server 90 to the flow engine 77 of the off-premise server 75 (indicated by the arrows labeled "D" in FIG. 2).

The agent 78 and deployment component 82 of the off-premise server 75 deploy the sub-flow 77A to the flow engine 77. Once it is deployed successfully, the system is now in the state where two instances of the same sub-flow are deployed: one instance on the on-premise flow engine 92 and one instance on the off-premise flow engine 77. The sub-flow mechanism copes with this by alternately sending requests between the first sub-flow instance running on the on-premise server 90 and the second sub-flow instance running on the off-premise server 75. Once the original deployment component 98 has been notified of a successful deployment of the sub-flow on the off-premise server 75, it then tells the on-premise flow engine 92 to stop its instance of the sub-flow (e.g., sub-flow 92A). At this point, running of the first sub-flow instance located on the on-premise server 90 is terminated (i.e., requests are no longer sent to the first sub-flow instance) and the second sub-flow instance continues to run (i.e., requests continue to be sent to the second sub-flow instance) located on the off-premise server 75.

In an embodiment, the deployment components 82, 98 can keep a record of where sub-flows are transferred to so when the flow is re-deployed it is able to un-deploy the remote sub-flows. In an embodiment, the deployment components 82, 98 can keep a record of where sub-flows are transferred to so that sub-flows can be recombined.

The example provided above describes a simple usage to move high CPU workloads from the on-premise server 90 to an off-premise server 75, such as a cloud-based server. However, embodiments of the present invention are not limited to this example. Additional embodiments of the present invention can provide for distribution of sub-flows between on-premise servers and/or off-premise servers in order to provide for:

(i) Running multiple instances of the same sub-flow on both on-premise and off-premise servers at the same time (e.g. to provide more processing capacity or scalability);

(ii) Combining several servers (on-premise and/or off-premise) to allow workloads to be spread across many servers. This may require communication between all available deployment components in order to determine an optimal server to which a sub-flow should be transferred;

(iii) Grouping and recombining sub-flows back into grouped or combined sub-flows; and (iv) On a redeployment of the application flow, automatically transferring sub-flows to other systems based on previous analytics.

Figure 3A:
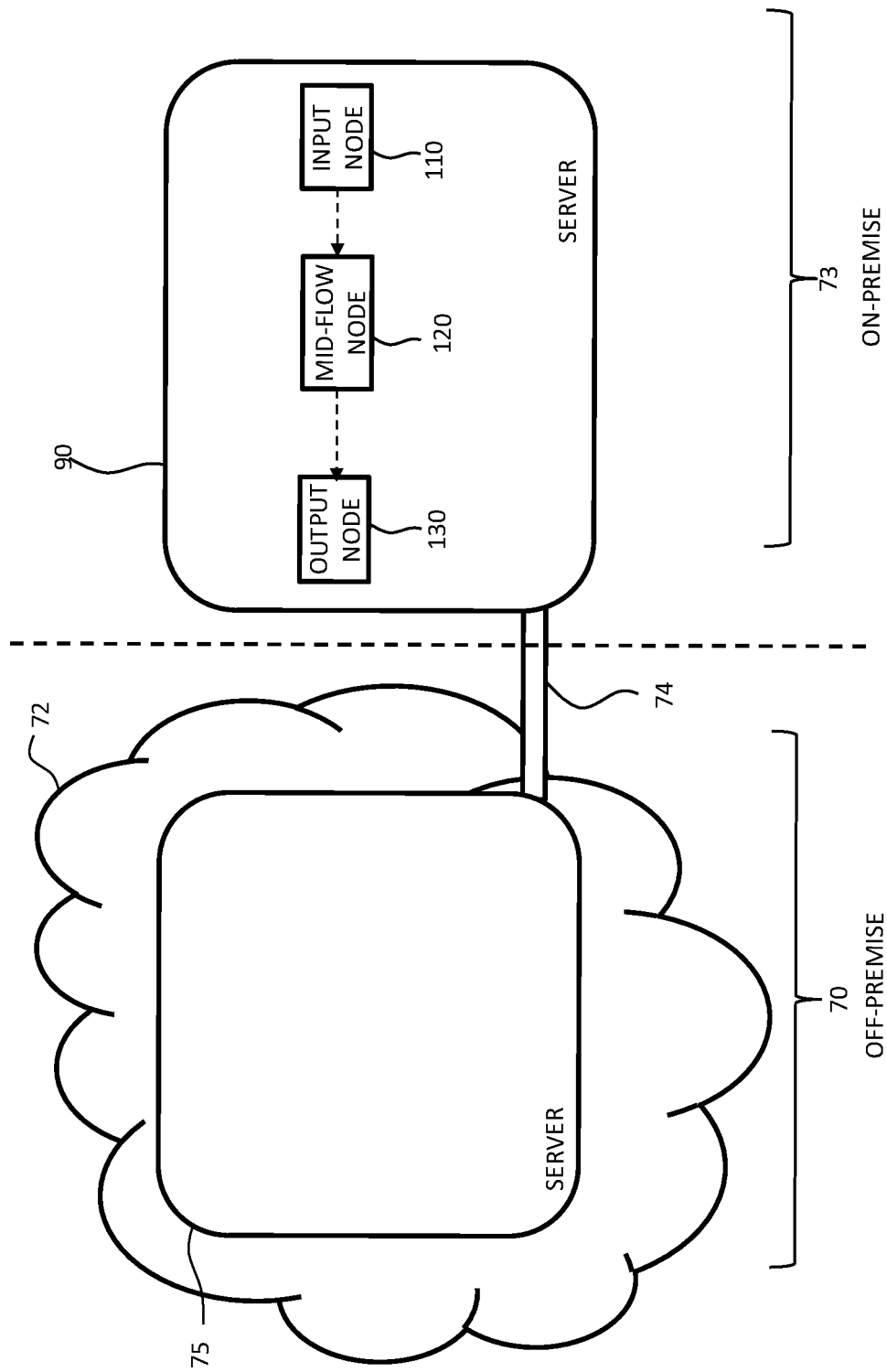
FIGS. 3A-3C depict an exemplary process of deploying an application across the on-premise and off-premise servers of FIGS. 1 and 2 in accordance with at least one embodiment of the present invention.
Figure 3B:
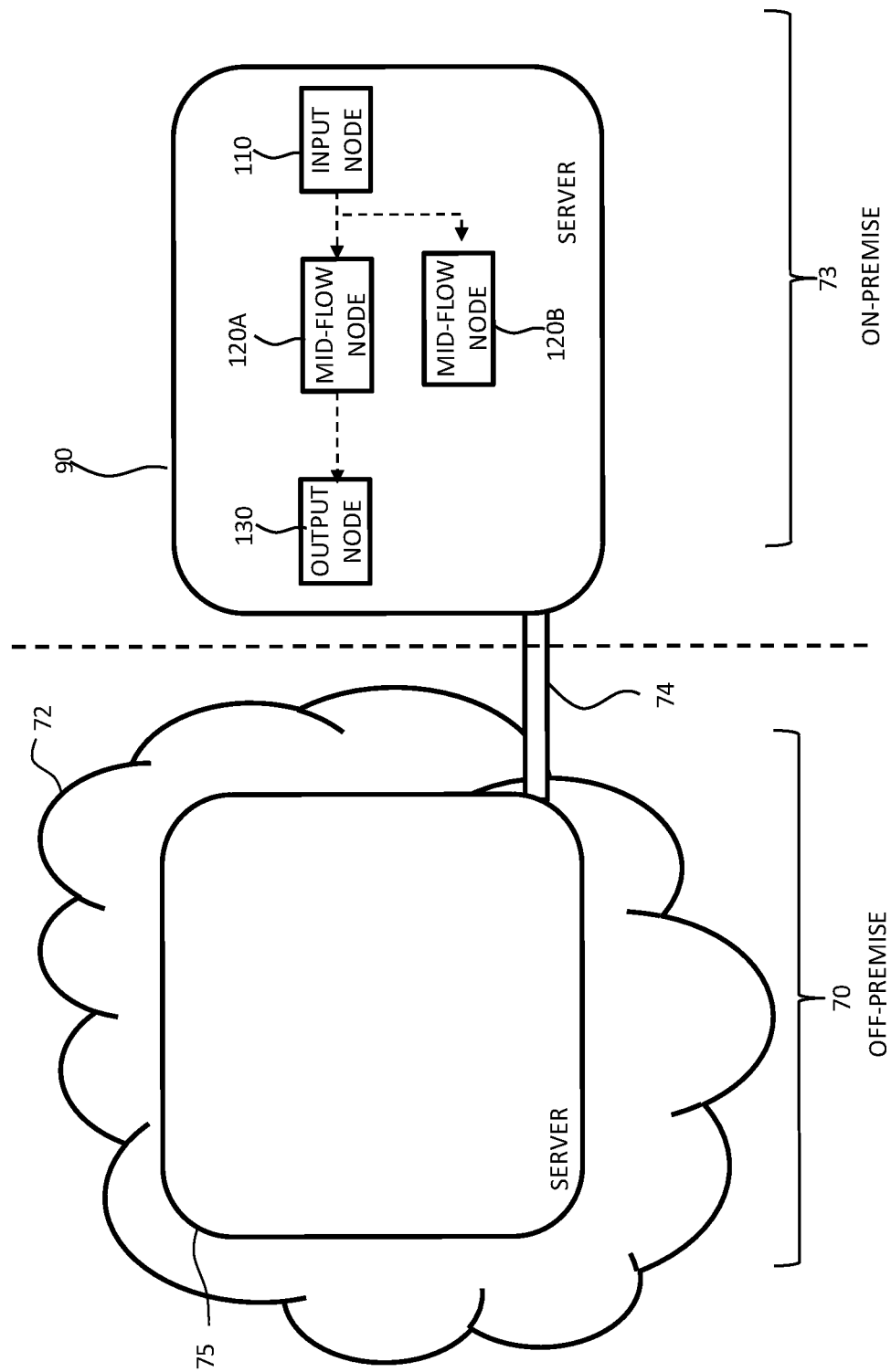
Figure 3C:
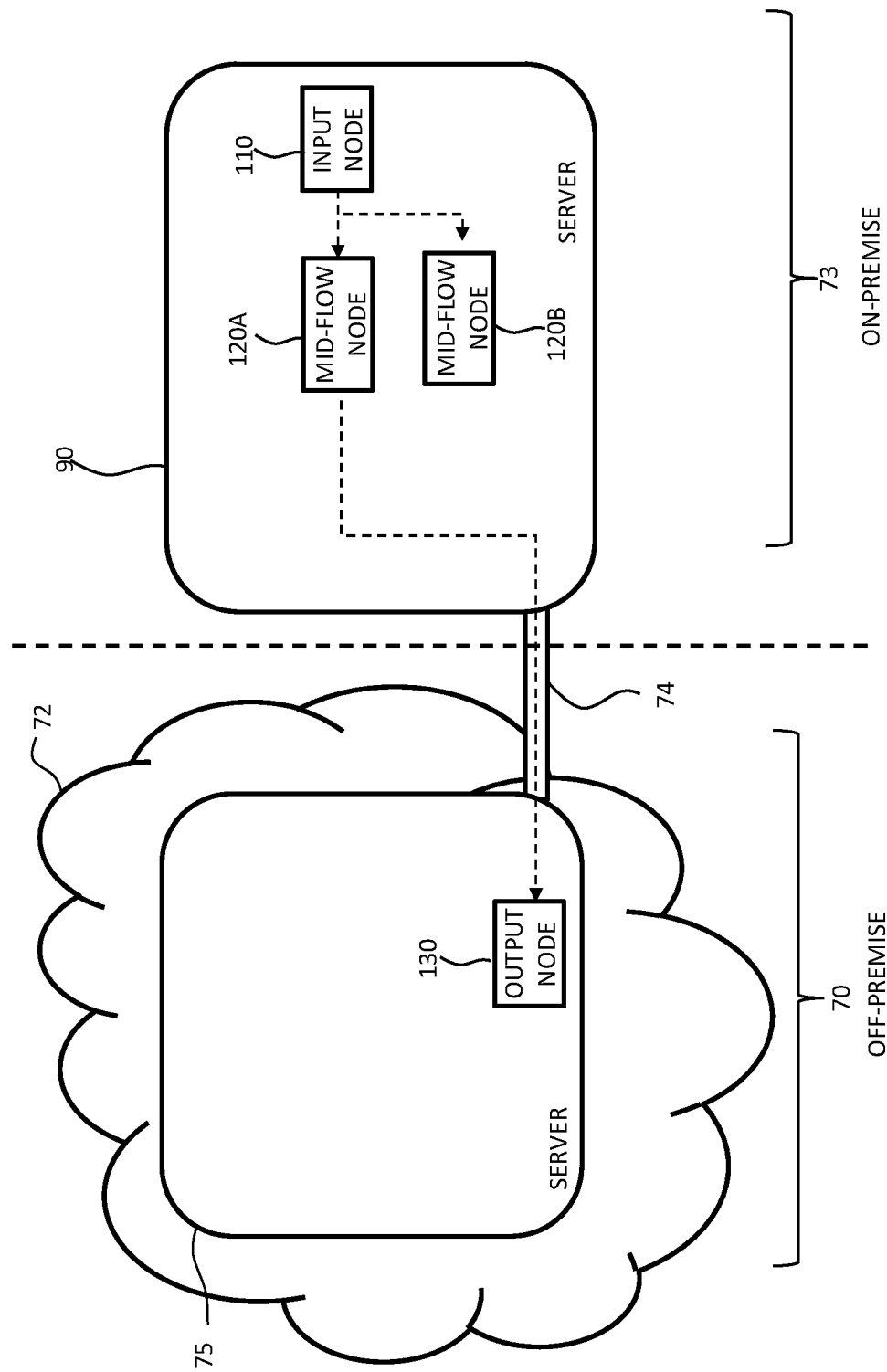

Referring now to FIGS. 3A to 3C, there is depicted an exemplary process of deploying an application between the on-premise server 90 and the off-premise server 75 of FIGS. 1 and 2.

As depicted in FIG. 3A, an application flow is provided in the on-premise server 90. The application flow includes an input node 110, a mid-flow node 120, and an output node 130. Such nodes may, for example, be identified by the flow analysis component 96 (depicted in FIGS. 1 and 2) of the on-premise server 90.

Based on analysis by the flow analysis component 96 (depicted in FIGS. 1 and 2) of the on-premise server 90, the flow engine (i.e. decomposition component) 92 (depicted in FIGS. 1 and 2) of the on-premise server 90 determines that the application flow should be split at the mid-flow node 120.

As depicted in FIG. 3B, the flow engine (i.e. decomposition component) 92 (depicted in FIGS. 1 and 2) of the on-premise server 90 splits the mid-flow node 120 of the application flow into mid-flow node 120A and mid-flow 120B. As a result, the application flow is split into two sub-flows per node running on the same on-premise server 90.

After performance analysis by the monitor component 100 (depicted in FIGS. 1 and 2) of the on-premise server 90, it is determined that the output node can be moved to the off-premise server 75. Thus, as depicted in FIG. 3C, the deployment component 98 (depicted in FIGS. 1 and 2) of the on-premise server 90 pushes the sub-flow of the output node 130 to the off-premise server 75.

In the above example of FIGS. 3A-3C, although the output node 130 is moved from the on-premise server 90 to the off-premise server 75, the application flow is still logically the same. In other words, despite re-deployment of the application flow as one or more sub-flows from on-premise server 90 to off-premise server 75, the application flow logic is maintained.

Embodiments of the present invention described above only include two servers: one off-premise server and one on-premise server. However, one of ordinary skill in the art will appreciate that embodiments of the present invention can be scaled to multiple servers both off-premise and/or on-premise. Furthermore, one of ordinary skill in the art will appreciate that on-premise servers and/or off-premise servers need not be connected to the same network. In additional embodiments, the steps illustrated in FIGS. 3A-3C can be practiced with an application flow originally being deployed on an off-premise server, such as off-premise server 75.

Accordingly, in these additional embodiments, the off-premise server 75 can split a mid-flow node of an application flow into multiple sub-flows. Based on determined performance metrics of the sub-flows, one or more of the sub-flows can be moved to an on-premise server, such as on-premise server 90.

Referring now to FIG. 4, there is shown a flow diagram of a method for deploying an application across off-premise and/or on-premise servers in accordance with at least one embodiment of the present invention. The method 400 of FIG. 4 is described as being implemented using a system according to at least one embodiment of the present invention. It should be noted that for purposes of describing the method of FIG. 4, an off-premise environment includes a plurality of cloud servers, in which an application is provided as a service on a cloud server. However, one of ordinary skill in the art will appreciate that embodiments of the present invention can be practiced with any number or combination of off-premise servers and/or on-premise servers.

At step 410, a plurality of nodes in an application flow are identified. It should be appreciated that since flows are defined in human readable, well-structured documents using a format like JSON or XML, each node (i.e. a discrete set of processing steps) within the application flow can be clearly identified within these documents and can be split deterministically into a set of sub-flows. In some embodiments, a flow containing (n) nodes can be split into (n) sub-flows. In other words, there is a 1:1 ratio between nodes and sub-flows created (one sub-flow created per node). In other embodiments, a flow containing (n) nodes can be split into more than (n) sub-flows. For example, a flow containing (n) nodes can be split into (2n) sub-flows or (3n) sub-flows. In other words, there can be a 1:2 ratio (two instances of the same sub-flow per node) or 1:3 ratio (three instances of the same sub-flow per node), etc. between nodes and sub-flows created.

At step 420, the application flow is split at the plurality of nodes to form a plurality of sub-flows of the application. In some embodiments, one or more of the plurality of nodes are split to form one or more sub-flows of the application. In other embodiments, all of the nodes in the plurality of nodes are split to form a plurality of sub-flows. One of ordinary skill in the art will appreciate that splitting of the application flow into callable sub-flows in accordance with embodiments of the present invention is transparent and does not change the interface between each node. In this way, a user does not have to re-engineer application flows to make use of the proposed concept(s).

At step 430, a flow execution workload of the application is routed to the plurality of sub-flows of the application. Routing of the flow execution workload may include, but is not limited to, initially distributing the sub-flows across the on-premise and/or off-premise servers based on a target performance characteristic(s).

At step 440, performance characteristics of the sub-flows are monitored. By way of example, the performance characteristics monitored can include, but are not limited to: latency, throughput, round-trip time, CPU utilization, available bandwidth, and available storage.

Based on the performance characteristics, the sub-flows are redistributed across the on-premise and/or off-premise servers at step 450. Such redistribution may, for example, include relocating one or more of the sub-flows to different servers. This may be done to reduce workload of a particular server and/or to increase available storage space of a server, for example. In some embodiments, a sub-flow is redistributed across the on-premise 90 and/or off-premise servers 75 in response to determining that a particular performance characteristic of the sub-flow is above a predetermined threshold. In other embodiments, a sub-flow is redistributed across the on-premise 90 and/or off-premise 75 servers in response to determining that a particular performance characteristic of the sub-flow is below a predetermined threshold.

At step 460, performance characteristics of the sub-flows are monitored once again after the redistribution. In some embodiments, based on the performance characteristics of the sub-flows after redistribution, one or more sub-flows are redistributed at step 470. Such further redistribution may, for example, include combining at least two of the plurality of sub-flows of the application to form a modified sub-flow of the application. In other embodiments, if the performance characteristics of the plurality of sub-flows is satisfied, step 470 is skipped, and the sub-flows are not redistributed or combined.

One of ordinary skill in the art will appreciate that the above-mentioned process of monitoring performance characteristics of the sub-flows and then redistributing the sub-flows based on the performance characteristics may be repeated so as to repeatedly and/or continuously adapt or reconfigure the sub-flows (e.g. according to target performance characteristics).

Thus, from the above description of the method of FIG. 4, one of ordinary skill in the art will appreciate that there is provided a method for deploying an application across off-premise and/or on-premise servers that may dynamically adapt or modify the deployment according to measured or monitored performance characteristics.

Various embodiments of the present invention, such as those presented above with reference to their figures, may provide the benefit of enabling automatic and/or dynamic hybridization of application flows). This may be done at runtime and without involving a developer.

As will be apparent from the above description, an off-premise resource may be provided by a cloud-computing system. Also, a system or method for deploying an application across off-premise and/or on-premise platforms may be provided or implemented in a hybrid cloud-computing system.

Figure 5:
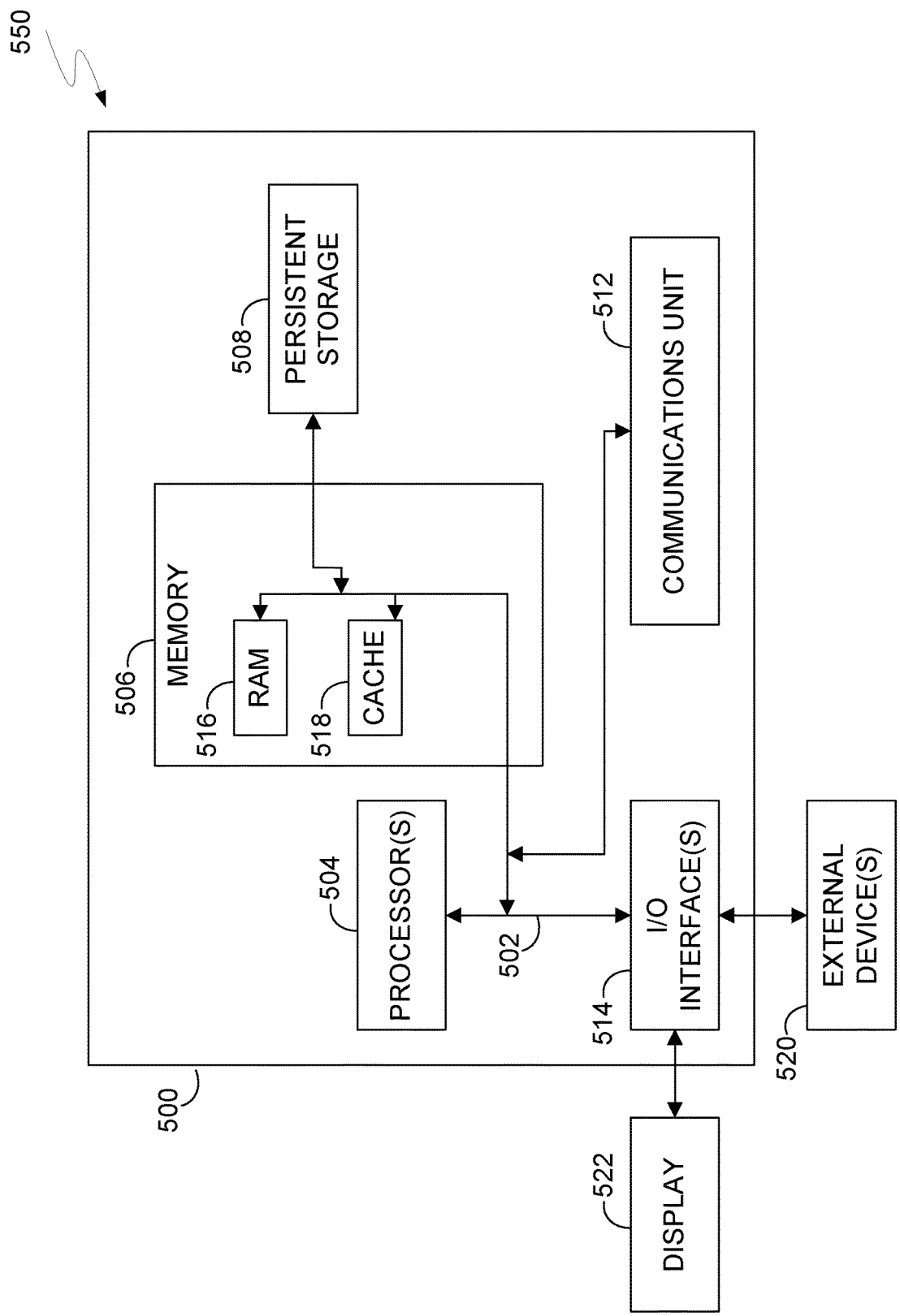
FIG. 5 illustrates a cloud system node, generally designated 550, in accordance with at least one embodiment of the present invention.

FIG. 5 is a schematic of an example of a cloud computing node, generally designated 550, in accordance with at least one embodiment of the present invention. Cloud computing node 550 includes computer system/server 500. Computer system/server 500 includes one or more processor(s) 504 (including one or more computer processors), communications fabric 502, memory 506 including, RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computer system/server 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media. Memory 506 can include at least one program product having a set (e.g., at least one) of program modules that are configured to carry out the function of various embodiments of the present invention.

Program instructions can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computer system/server 500 such that the input data may be received, and the output similarly transmitted via communications unit 512.

I/O interface(s) 514 allows for input and output of data with other devices that may operate in conjunction with computer system/server 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
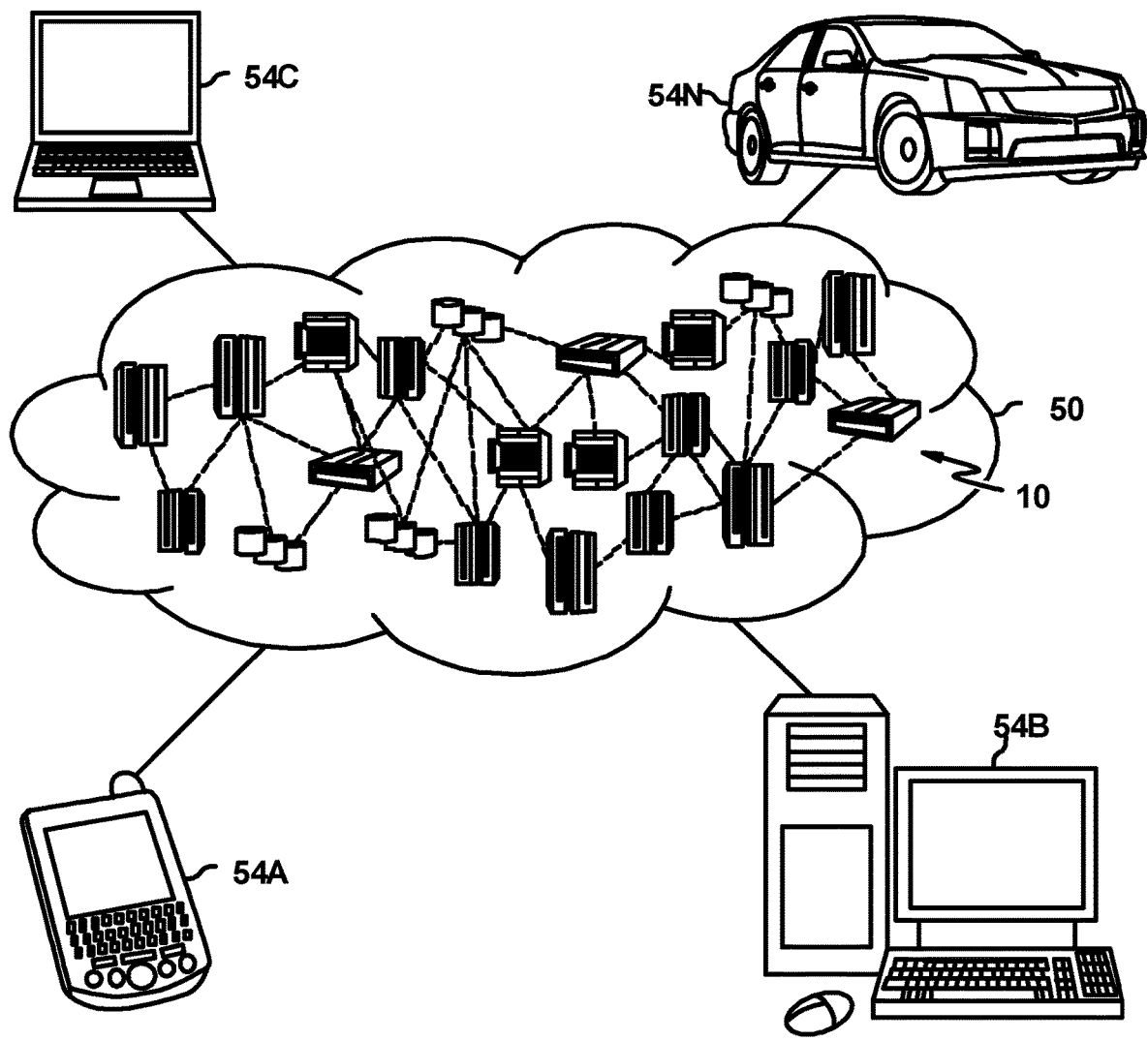
FIG. 6 illustrates a cloud computing environment in accordance with at least one embodiment of the present invention.

FIG. 6 is a block diagram depicting a cloud computing environment 50 in accordance with at least one embodiment of the present invention. For example, cloud computing environment 50, in some embodiments, can be equated to the cloud computing system as depicted in FIG. 1. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
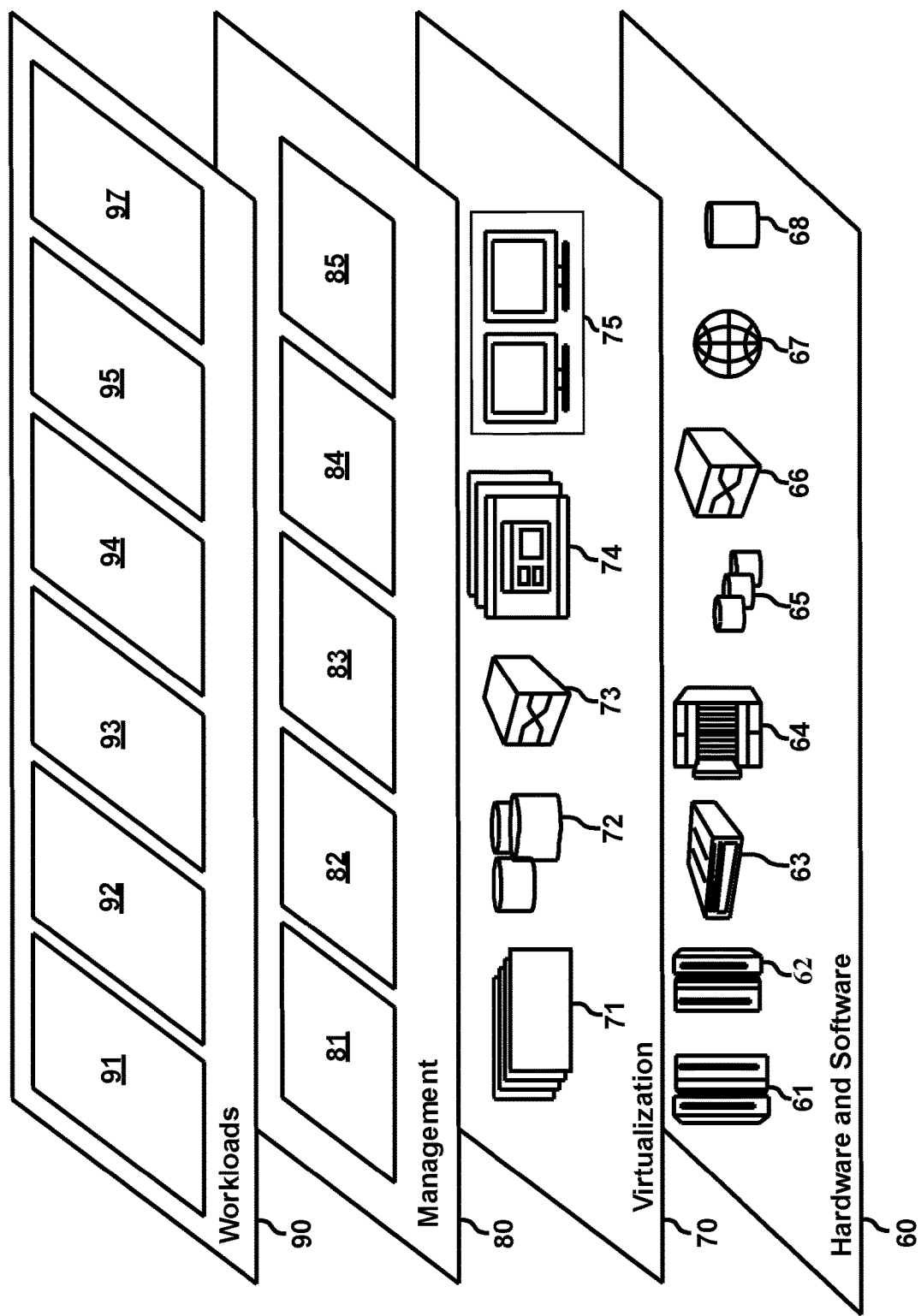
FIG. 7 illustrates cloud abstraction mode layers in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic modification of integration flows in hybrid cloud environments 97.

What is claimed is:

1. A computer system for deploying an application between a plurality of servers, the computer system comprising:
    one or more computer processors;
    one or more computer readable storage media;
    computer program instructions;
    the computer program instructions being stored on the one or more computer readable storage media for execution by the one or more computer processors; and
    the computer program instructions including instructions to:
        identify a plurality of nodes in a flow of an application deployed on a first server hosted on an on-premise platform, wherein a node in the flow of an application is a discrete set of instructions;
        split the flow at the plurality of nodes to form a plurality of sub-flows of the application;
        form a second, duplicate instance of a sub-flow in the plurality of sub-flows of the application; and
        route the second, duplicate instance of the sub-flow in the plurality of sub-flows of the application from the first server hosted on the on-premise platform to a second server hosted on an off-premise platform, wherein a first instance of the sub-flow remains located on the first server hosted on the on-premise platform.

2. The computer system of claim 1, further comprising instructions to:
    monitor performance characteristics of the plurality of sub-flows of the application; and distribute a sub-flow in the plurality of sub-flows from the first server hosted on the on-premise platform to the second server hosted on the off-premise server based on a performance characteristic of the sub-flow of the application.

3. The computer system of claim 1, further comprising instructions to:
    combine two or more sub-flows in the plurality of sub-flows of the application to form a modified sub-flow of the application based, at least in part, on performance characteristics of the two or more sub-flows of the application.

4. The computer system of claim 1, further comprising instructions to:
    distribute a sub-flow in the plurality of sub-flows of the application from the first server hosted on the on-premise platform to the second server hosted on the off-premise platform based on a target performance characteristic for the sub-flow.

5. The computer system of claim 2, wherein the performance characteristic is selected from the group consisting of: latency, throughput, round-trip time, CPU utilization, available bandwidth, and storage requirements.

6. The computer system of claim 1, wherein the second server hosted on the off-premise platform is a cloud server, and the application is provided as a service of the cloud server.

7. The computer system of claim 1, further comprising instructions to:
    establish a secure tunnel for communicating the flow execution workload of the plurality of sub-flows of the application between the first server hosted on the on-premise platform and the second server hosted on the off-premise platform.

8. A computer-implemented method for deploying an application between a plurality of servers, the method comprising:
    identifying a plurality of nodes in a flow of an application deployed on a first server hosted on an on-premise platform, wherein a node in the flow of an application is a discrete set of instructions;
    splitting the flow at the plurality of nodes to form a plurality of sub-flows of the application;
    forming a second, duplicate instance of a sub-flow in the plurality of sub-flows of the application; and
    routing the second, duplicate instance of the sub-flow in the plurality of sub-flows of the application from the first server hosted on the on-premise platform to a second server hosted on an off-premise platform, wherein a first instance of the sub-flow remains located on the first server hosted on the on-premise platform.

9. The computer-implemented method of claim 8, further comprising:
    monitoring performance characteristics of the plurality of sub-flows of the application; and
    distributing a sub-flow in the plurality of sub-flows from the first server hosted on the on-premise platform to the second server hosted on the off-premise platform based on a performance characteristic of the sub-flow of the application.

10. The computer-implemented method of claim 8, further comprising:
    combining two or more sub-flows in the plurality of sub-flows of the application to form a modified sub-flow of the application based, at least in part, on performance characteristics of the two or more sub-flows of the application.

11. The computer-implemented method of claim 8, further comprising:
    distributing a sub-flow in the plurality of sub-flows of the application from the first server hosted on the on-premise platform to the second server hosted on the off-premise platform based on a target performance characteristic for the sub-flow.

12. The computer-implemented method of claim 9, wherein the performance characteristic is selected from the group consisting of: latency, throughput, round-trip time, CPU utilization, available bandwidth, and storage requirements.

13. The computer-implemented method of claim 8, wherein the second server hosted on the off-premise platform is a cloud server, and the application is provided as a service of the cloud server.

14. The computer-implemented method of claim 8, further comprising:
    establishing a secure tunnel for communicating the flow execution workload of the plurality of sub-flows of the application between the first server hosted on the on-premise platform and the second server hosted on the off-premise platform.

15. A computer program product for deploying an application between a plurality of servers, the computer program product comprising one or more computer readable storage media and program instructions stored on the one or more computer readable storage media, the program instructions including instructions to:
    identify a plurality of nodes in a flow of an application deployed on a first server hosted on an on-premise platform, wherein a node in the flow of an application is a discrete set of instructions;
    split the flow at the plurality of nodes to form a plurality of sub-flows of the application;
    form a second, duplicate instance of a sub-flow in the plurality of sub-flows of the application; and
    route the second, duplicate instance of the sub-flow in the plurality of sub-flows of the application from the first server hosted on the on-premise platform to a second server hosted on an off-premise platform, wherein a first instance of the sub-flow remains located on the first server hosted on the on-premise platform.

16. The computer program product of claim 15, further comprising instructions to:
    monitor performance characteristics of the plurality of sub-flows of the application; and
    distribute a sub-flow in the plurality of sub-flows from the first server hosted on the on-premise platform to the second server hosted on the off-premise platform based on a performance characteristic of the sub-flow of the application.

17. The computer program product of claim 15, further comprising instructions to:
    combine two or more sub-flows in the plurality of sub-flows of the application to form a modified sub-flow of the application based, at least in part, on performance characteristics of the two or more sub-flows of the application.

18. The computer system of claim 1, further comprising instructions to:
    alternate sending requests to the first instance of the sub-flow running on the first server hosted on the on-premise platform and the second, duplicate instance of the sub-flow running on the second server hosted on the off-premise platform.

19. The computer-implemented method of claim 18, further comprising:
    responsive to a successful deployment of the second, duplicate instance of the first instance of the sub-flow on the second server hosted on the off-premise platform:

terminating sending requests alternately between the first instance of the sub-flow and the second instance of the sub-flow, and continuing to send requests to the second, duplicate instance of the sub-flow running on the second server hosted on the off-premise platform.

\* \* \* \* \*